United States Patent [19]

Stone, III et al.

[11] Patent Number: 4,862,763
[45] Date of Patent: Sep. 5, 1989

[54] METHOD AND APPARATUS FOR MANUFACTURING HIGH SPEED ROTORS

[75] Inventors: Earl L. Stone, III; James C. Foster, both of Arlington; Stanley L. Whitcher, Dallas, all of Tex.

[73] Assignee: LTV Aerospace & Defense Company, Dallas, Tex.

[21] Appl. No.: 569,067

[22] Filed: Jan. 9, 1984

[51] Int. Cl.$^4$ .................. B64C 11/02; B65H 81/00; F04D 29/26
[52] U.S. Cl. ........................... 74/572; 156/169; 156/173; 29/156.4 R; 29/156.8 R; 416/230; 416/241 A; 416/244 A
[58] Field of Search ............ 74/572; 318/161; 310/216, 179, 261; 415/DIG. 5; 428/64; 156/169; 264/257, 258, 263, DIG. 57; 416/218, 230, 241 A, 244 A

[56] References Cited

U.S. PATENT DOCUMENTS

| | | | |
|---|---|---|---|
| 3,698,262 | 10/1972 | Rabenhorst | 74/572 |
| 4,000,665 | 1/1977 | Rabenhorst | 74/572 |
| 4,413,860 | 11/1983 | Prescott | 74/572 X |

Primary Examiner—Thomas H. Tarcza
Assistant Examiner—Gilberto Barrón, Jr.
Attorney, Agent, or Firm—S. S. Sadacca; J. M. Cate

[57] ABSTRACT

A composite, carbon-carbon rotor or rotor hub (20) for use in power translating devices, such as in a turbine engine or in fluid pumps, includes a plurality of carbon-carbon laminate plies (P1–P25) layered to form the thickness of the rotor. The plies include alternating plies of cloth and spiral plies of fibrous material having different diameters to provide a desired variation in the cross-sectional configuration of the rotor. The individual spiral plies may vary in thickness from near the center to the outer edge and may be either tapered or formed to other contours. The cloth plies are positioned at predetermined orientations such that the strand axes are not aligned. These plies consist of fibrous carbon or graphite filament tape preimpregnated with a thermosetting polymer material, such as phenolic resin. The spiral plies are individual discs of resin impregnated fibrous carbon or graphite tow formed by winding the tow on a rotating shaft (54) having forming plates (56, 64) on both sides thereof to define the contour of the discs. The cross-sectional contour of the spiral plies is controlled by the forming face of the plates and by applying an appropriate tension to the tow during winding to completely fill the area between the forming faces during the winding process. The composite rotor or rotor hub is cured, pyrolyzed and densified using predetermined time/temperature/pressure cycles to form a high strength carbonized structure having orthotropic properties.

13 Claims, 4 Drawing Sheets

METHOD AND APPARATUS FOR MANUFACTURING HIGH SPEED ROTORS

TECHNICAL FIELD

This invention relates to a method and apparatus for manufacturing high speed rotors for use in power translation devices and, more particularly, to the manufacture of such rotors using spiraled and unidirectional strand composite carbon-carbon laminate piles.

BACKGROUND ART

In turbines, such as those and aircraft power plants, high operating efficiencies are generally associated with high operating temperatures. Internal temperatures of modern turbine engines may typically exceed 1500° F., for example. Moreover, the increased efficiencies potentially obtainable at even higher temperatures have not been realized, largely because of limitations in the properties of materials in current use. Because of the deleterious effects of high temperature gases upon structural components, the use of a variety of metallic and nonmetallic materials have been considered, including the ceramics, tungsten alloys, and more recently, carbonized composites.

Carbonized composite materials are currently being employed in certain aerospace structures which sustain substantial mechanical and thermal stress. Typical applications include the leading edge portions of spacecraft which are exposed to high temperatures and stresses during reentry. Such composite materials typically include a fibrous component, for example, carbon or graphite fibers in a matrix of carbon derived from pyrolyzing a thermosetting polymer material, such as phenolic. Carbonaceous fibers such as polyacrylonitrile, rayon, and pitch based fibers are converted to carbon or graphite through pyrolysis techniques and are then impregnated with carbonaceous liquid materials. The impregnated fibers are available either in the form of interwoven cloth or roving or unidirectional "tape" in which bundles of the fibers are laid parallel to one another in a single direction without any cross-weave fibers interconnecting the fibers.

Processes for the manufacture of the composite materials typically entail the formation of an uncured workpiece substantially of the configuration desired for the structure. The workpiece is cured under a prescribed time/temperature/pressure cycle and then pyrolyzed to high temperatures to form a carbonized structure, having both fibrous and matrix components in the carbonized state. The workpiece is then densified in a multistep process to form a high strength carbonized structure. The carbonized workpiece, or substrate, may then be coated with an oxidation resistant coating typically containing silicon carbide and silicon metal. Such coated carbon-carbon materials have been demonstrated to maintain structural integrity when exposed to temperatures in excess of 2000° F. and have substantially greater structural strength and toughness than most ceramic structures.

Although such carbon-carbon structures may be selectively reinforced to enhance resistance to stress loads along particular axes and at particular regions by appropriate orientation and configuration of the fibrous reinforcing material prior to cure, arrangement of such fibrous materials to withstand the high centrifugal forces encountered in a turbine engine rotor has not heretofore been achieved. Indeed, composite, carbon-carbon rotors used in turbine engines have been susceptible to disintegration from high centrifugal forces and high turbine temperatures. The possibility of the disintegration is increased where large rotor diameters are required and where higher speeds are likewise necessitated. A method of producing a composite ring suitable for incorporating in the rotor of a gas turbine engine is disclosed in U.S. Patent No. 3,966,523 to . Karl S. Jakobsen and David B. McLaughlin, issued June 9, 1976. The rotor disclosed in this patent incorporates a composite ring having a plurality of spirally wound filaments in adjacent relationship. This composite ring is manufactured by winding each filament into a polymer matrix to form a monolayer sheet having essentially circular filament hoops. The monolayer sheets are stacked in adjacent relationship and the polymer matrix is finally cured under pressure to form a unitized composite ring. In this design, little flexibility is provided for the design of various contours in producing the engine rotors, and further, the incorporation of the individual monolayer sheets as disclosed does not produce a rotor having an optimum rotational capability to withstand high speeds without failure for rotor blades of sufficient size to produce the greatest output.

DISCLOSURE OF THE INVENTION

The present invention provides a composite, carbon-carbon rotor for use in power translating devices, such as in a turbine engine or in fluid pumps. In accordance with one embodiment of the invention, a high speed rotor comprises a plurality of carbon-carbon laminate plies layered to form the thickness of the rotor. The plies comprise resin impregnated carbon or graphite cloth and spiral plies of fibrous material having different diameters to provide a desired variation in the cross-sectional configuration of the rotor. The spiral plies may vary in thickness from the center to the outer edge and may be either tapered or formed to other contours as desired.

In one embodiment of the invention, the spiral and cloth plies are alternated to make up the rotor. Further, certain of the cloth plies are positioned at predetermined orientations such that the strand axes are not aligned. For example, the cloth plies are positioned so that the axes of the material are placed at staggered orientations.

In the primary embodiment of the invention, the spiral plies consist of fibrous carbon or graphite tow preimpregnated with a thermosetting polymer material, such as phenolic resin. Likewise, the cloth plies are comprised of fibrous carbon or graphite interwoven cloth preimpregnated with a thermosetting polymer material, such as phenolic resin.

The spiral plies are individual discs formed of resin impregnated fibrous carbon or graphite tow forced by winding the tow on a rotating shaft having forming plates on both sides thereof to define the contour of the discs. In a primary embodiment, each disc is tapered from its axis to its outer circumference. Such taper is controlled by confronting forming faces of the forming plates and by applying tension to the tow during winding as is required to completely fill the area between the forming faces of the plates.

The apparatus for forming the spiral discs includes a rotatable shaft and means for rotating the shaft. The shaft has first and second forming plates positioned thereon. The first plate is adjustable along the longitudinal axis of the shaft and has a forming face confronting a corresponding face of the second forming plate. The second forming plate is fixed on the longitudinal axis of the shaft and may be adjusted angularly relative to the shaft axis to permit aligning the plates in a parallel orientation or in an other than parallel orientation for purposes of controlling the contour of the discs.

The winding of a fibrous tow around a shaft and between the forming plates is controlled by applying tension to the tow such that the width of the tow fills the dimension between the forming plates even though such width may vary depending upon the disc contour. In a primary embodiment, the forming faces of the first and second plates are angled to produce a constant tapered disc from near the center axis of th disc to the outer circumference.

The present invention also includes the method for forming the high speed rotor which includes forming a plurality of plies using fibrous carbon or graphite cloth and using fibrous carbon or graphite tow wound to form spiral discs. The plies are stacked using a predetermined arrangement of cloth layers and spiral discs and debulked by subjecting the layers to a sufficient pressure, followed by curing the fibrous plies using a thermosetting polymer material. Curing is accomplished using a predetermined time/temperature/pressure cycle. The plies are thereafter pyrolyzed to an elevated temperature then densified in multiple process cycles to form a high strength carbonized structure.

BRIEF DESCRIPTION OF THE DRAWINGS

For a more complete understanding of the present invention, and for further details and advantages thereof, reference is now made to the following Detailed Description taken in conjunction with the accompanying Drawings, in which.

DETAILED DESCRIPTION

Figure 1:
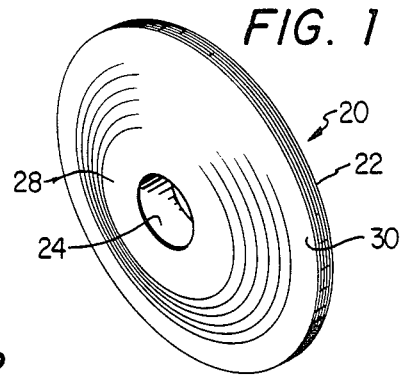
FIG. 1 is a perspective view of a rotor or a hub of a rotor made in accordance with the present invention.

FIG. 1 illustrates a rotor 20 made in accordance with the present invention. The rotor is a circular composite, carbon-carbon disc having a plurality of plies 22 with an aperture 24 therethrough. The disc has a stepped taper from a thicker midsection 28 to a narrower outer circumference 30.

As will be discussed hereinafter in greater detail, the present invention facilitates the production of turbine rotors having various cross sectional configurations. The rotor shown in FIGURE 1 has an outwardly tapering cross sectional design. This arrangement, coupled with the structure of the present invention, provides a rotor which can sustain extremely high rotational speeds to store energy. Thus, because the energy stored in a rotor increases as the square of the rotational speed, higher rotational speeds correspond to greater energy stored in the rotor even though the mass is concentrated near the axis of rotation rather than at the outer circumference of the rotor. Increases in rotational speeds more than compensate for the loss of stored energy as a result of shifting of the rotor mass radially inwardly.

Further, rotors of the design shown in FIG. 1 lend themselves to manufacture using carbonized composite materials. As can be appreciated, although multi-bladed turbine rotors of complex configuration may be formed readily of various metal alloys using teachings well known in the art, the manufacture of a carbonized composite rotor having a plurality of blades or buckets and having the capability of sustaining extremely high circumferential and vibrational loads entail substantial technical difficulty.

The workpiece as shown in FIG. 1 can be used to form the hub region of a multiple blade axial or radial gas turbine. Alternatively, by using the same process but differently configured spiral plies, other hub regions for bladed rotors can be fabricated.

However, rotational composite discs having an integral, continuous peripheral region (one not divided into multiple blades or buckets) may also be used in gas turbines or, alternatively, in pumps. As used in gas turbines, rotors of the type similar to the configuration shown in FIG. 1 are mounted on a shaft and positioned in a housing having an inlet through which propulsive gases are conducted into an annular space defined between the discs and around the peripheral region thereof. Tangential and radial forces, derived from reactive and viscous engagement of the gases with the mutually confronting disc surfaces, induce rotational movement of the rotor. Gas under pressure follows a spiral flow path to an appropriate exhaust channel and out of the housing. In a related fashion, the present rotors can be used as the rotor of a pump. In this application, the rotor is rotated in conjunction with a pump shaft for driving fluid surrounding the rotor as a result of tangential and radial forces derived from reactive and viscous engagement of the fluid by the rotor.

An example of such turbine and pump designs is embodied in patent application Ser. No. 497,998, filed 5/25/83, U.S. Pat. No. 4,655,674 entitled Power Translation Device, and assigned to Vought Corporation, the assignee of the present application and invention. Reference to such application is hereby made and such application is incorporated herein by reference for all purposes.

Figure 2:
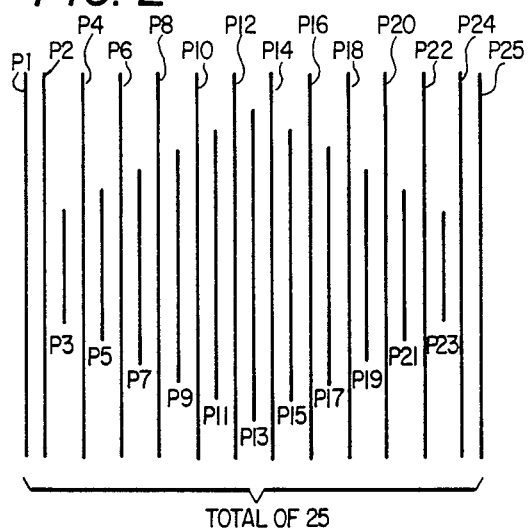
FIG. 2 is a side view of the rotor of FIG. 1 with the layers exploded to show arrangement of the layers.
Figure 3:
FIG. 3 is a vertical section view taken through the rotor of FIG. 1.
Figure 4:
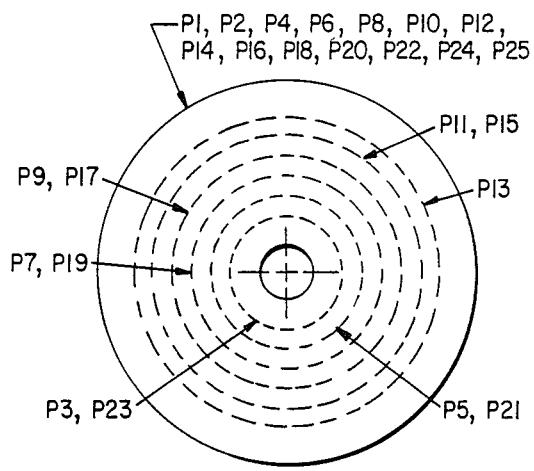
FIG. 4 is a plan view of the rotor.

FIGS. 2, 3 and 4 illustrate the structure of rotor 20. FIG. 2 shows the rotor with the plies exploded to show the variation in the diameters of the various plies. Specifically, rotor 20 includes, in the embodiment shown, plies P1–P25. In a preferred embodiment, certain of the layers are cloth of fibrous carbon or graphite fiber preimpregnated with a thermosetting polymer material, such as phenolic resin. Other plies are spiral discs consisting of fibrous carbon or graphite tow wound in a spiral configuration. In the embodiment illustrated in FIGS. 1–4, layers P1, P2, P4, P6, P8, P10, P12, P14, P16, P18, P20, P22, P24, and P25 consist of preimpregnated cloth. Layers P3, P5, P7, P9, P11, P13, P15, P17, P19, P21, and P22 are spiral discs consisting of preimpregnated fibrous graphite tow. The construction of these spiral discs will be disclosed hereinafter in greater detail.

FIGS. 3 and 4 illustrate rotor 20 in its assembled configuration. FIG. 4 illustrates the outer circumference of the various layers P1–P25. In the embodiment shown, layers P3 and P23 have the smallest diameter, followed by layers P5 and P21, then layers P7 and P19. Layers P9 and P17 are the next largest layers, followed by layers P11 and P15. Layer P13, the centermost layer is next in diameter dimension. The remaining layers are of cloth and of equal diameter and are of the overall diameter of the rotor.

Figure 5:
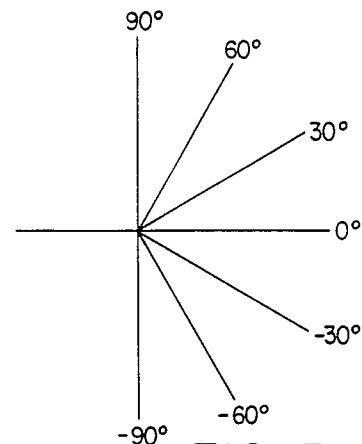
FIG. 5 is a scale showing the various angles of orientation of certain of the material plies used in forming the rotor.
Figure 6:
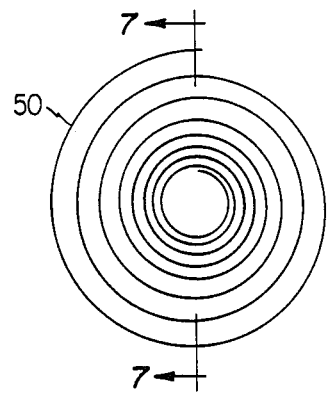
FIG. 6 is a plan view of the spiral discs plies used in constructing the rotor.
Figure 7:
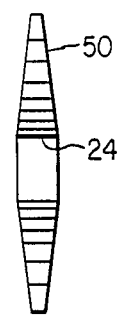
FIG. 7 is a section view taken along line 7—7 of FIG. 6.

The layers of cloth, namely layers P1, P2, P4, P6, P8, P10, P14, P16, P18, P20, P22, P24, and P25, are oriented with their warp axes as differing angles of orientation. FIG. 5 illustrates the various angles of orientation ranging from 0°, corresponding to a horizontal orientation as viewed in FIG. 4, to 90°, corresponding to a vertical orientation as viewed in FIG. 4. The following table identifies the orientation of each layer in accordance with the orientation diagram illustrated in FIG. 5. The spiral plies are indicated as "spiral" and naturally do not have an axis of orientation as do the tape layers.

| PLY NO. | ORIENTATION |
|---|---|
| P1 | −60° |
| P2 | 0° |
| P3 | SPIRAL |
| P4 | +60° |
| P5 | SPIRAL |
| P6 | −60° |
| P7 | SPIRAL |
| P8 | +90° |
| P9 | SPIRAL |
| P10 | −30° |
| P11 | SPIRAL |
| P12 | +30° |
| P13 | SPIRAL |
| P14 | +30° |
| P15 | SPIRAL |
| P16 | −30° |
| P17 | SPIRAL |
| P18 | +90° |
| P19 | SPIRAL |
| P20 | −60° |
| P21 | SPIRAL |
| P22 | +60° |
| P23 | SPIRAL |
| P24 | 0° |
| P25 | −60° |

The structure of and method of forming the spiral plies, that is plies P3, P5, P7, P9, P11, P13, P15, P17, P19, P21, and P23, are illustrated in FIGS. 6–9. These spiral plies are preferably formed from a single fibrous graphite tow 50 which is formed into a spiral using the apparatus 52 illustrated in FIGS. 8 and 9. Spiral forming apparatus 52 includes a threaded shaft 54 with a first forming plate 56 having a threaded central bore for threaded engagement on shaft 54. Plate 56 has a contoured forming face 62 confronting a cooperating forming plate 64. Plate 64 is backed by a hub 66 for threaded engagement on shaft 54. Hub 66 is positioned relative to plate 64 by adjustment screws 70. By adjusting screws 70, the angle of orientation of forming plate 64 may be varied to adjust the parallelity of plate 64 with plate 56. Plate 64 has a forming face 72 which confronts forming face 62 of plate 56. The distance between the confronting faces of plates 56 and 64 is readily adjusted by the advancement or retraction of the units on shaft 54. Locking nuts 58 and 78 lock the forming plates in position once they are adjusted.

Each spiral ply is formed by engaging one end of an appropriate fibrous tow to shaft 54 and rotating the shaft to wind the tow thereby forming a spiral layer. A graphite strand, preimpregnated with phenolic resin of cross-sections 0.010 inch by 0.025 inch has been found to be suitable for purposes of the present invention, although strands of other dimensions could be used. As will be noted, the spiral ply produced by the forming plates shown in FIGS. 8 and 10 has an outward taper. This taper is accomplished by applying an appropriate tension on the tow such that the tow is widened at the shaft to completely fill the area between forming faces 62 and 72 of plates 56 and 64. As the spiral progresses outwardly, the tow will just fill the gap between the confronting faces without widening beyond the space therebetween.

Figure 10:
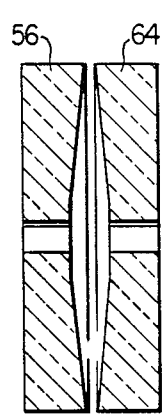
FIGS. 10, 11, 12 and 13 are alternative forms used in the spiral forming apparatus shown in FIGS. 8 and 9.
Figure 11:
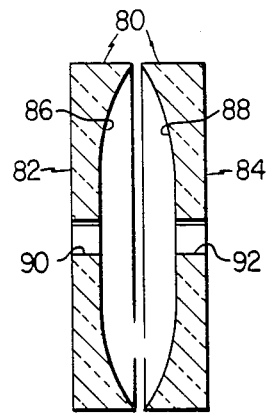
Figure 12:
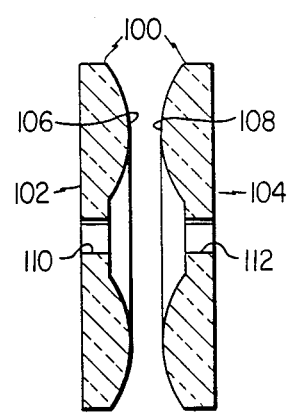
Figure 13:
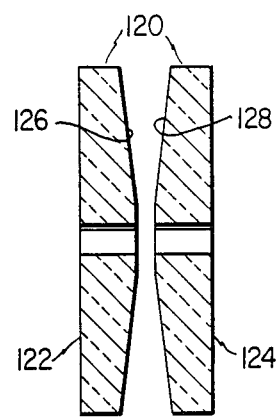

FIG. 10 shows a cross section of forming plates 56 and 64 removed from shaft 74 and without hub 66 or locking nuts 58 and 78. FIGS. 11, 12, and 13 show other forming plates 80 and 100 which may be used to produce spiral plies or discs having varying contours.

Forming plates 80 include a pair of cooperating discs 82 and 84 having forming faces 86 and 88, respectively. Each disc has an aperture 90 and 92 therethrough. Forming faces 86 and 88 provide a gradual curve to produce a disc having a narrower dimension at the outer circumference than adjacent the center. The contour is more parabolic rather than a constant taper as provided for by the forming plates 56 and 64 illustrated in FIG. 10.

FIG. 12 illustrates plates 100 including forming discs 102 and 104 having forming faces 106 and 108, respectively. The forming faces 106 and 108 produce a disc having a thinner intermediate section when compared to the center of the disc and the outer edge. The forming plates likewise have apertures 110 and 112 for accepting shaft 54 therethrough.

FIG. 13 illustrates plates 120 including forming discs 122 and 124 having forming faces 126 and 128, respectively. The forming faces 126 and 128 produce a disc having a thicker outer edge than inner center.

Figure 8:
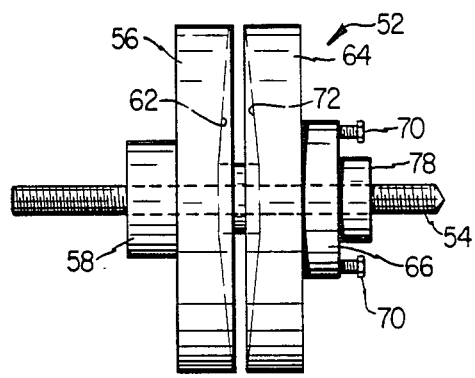
FIGS. 8 and 9 are end and elevational views, respectively, of the apparatus for forming the spiral discs shown in FIGS. 6 and 7.
Figure 9:
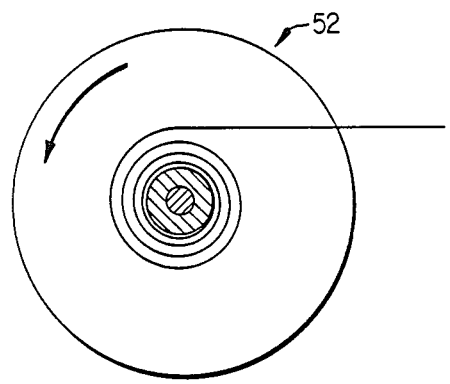

Thus, it can be seen that varying contours for the spiral disc may be readily produced by merely substituting forming plates 80, 100, or 120 for plates 56 and 64 shown in FIG. 8. It will be appreciated that other forming plate shapes may be incorporated to produce the desired cross-sectional configuration for spiral discs used to produce desired rotor cross-sections.

Formation of a rotor according to the present invention is accomplished in a primary embodiment in the following manner. As is noted in FIG. 2, the spiraled plies, having the prescribed diameters, are formed using the forming structure illustrated in FIGS. 8 and 9. For a seven inch diameter rotor, the spiral plies having the following diameters may be used:

P3—2.0 inches
P5—2.6 inches
P7—3.2 inches
P9—3.8 inches
P11—4.4 inches
P13—5.0 inches
P15—5.6 inches
P17—5.0 inches
P19—4.4 inches
P21—3.8 inches
P23—3.2 inches
P25—2.6 inches
P27—2.0 inches Plugs of cloth material are used to fill the center of the spiral plies. The cloth plies are continuous through the center. Plugs are necessary because the curing step entails applying pressure to the rotor which may otherwise distort the area adjacent to the aperture were plugs not incorporated.

Layup of the layers is accomplished in order from layer 1 to layer 29 using the orientation for the cloth described above. Layers 1-10 are laid up on a contoured mold and debulked by drawing a vacuum of one atmosphere and maintaining the temperature at between approximately room temperature and 120° F. Vacuum is held for approximately 20 minutes. Layers 11-20 are then applied, using the orientation for the cloth plies as outlined above, followed by debulking in the same manner as used for layers 1-10.

Thereafter, layers 21-29 are added using the orientation for the cloth plies outlined above, followed by debulking in the same manner as previously outlined. In the primary embodiment, the spiral plies are positioned such that the direction of spiral of the spiral plies are in the same direction. However, spirals may be positioned such that the direction of spiral of each spiral ply is not in the same direction, such as by positioning the spiral plies with the direction of spiral alternated from ply to ply.

Figure 14:
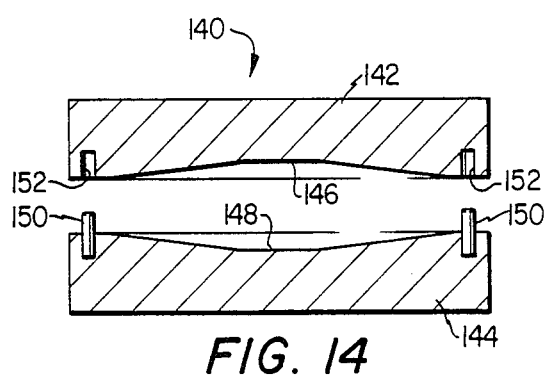
FIG. 14 is a side view of the mold used in one embodiment of the invention to form the composite rotor or rotor hub.

The multiple layers P1-P29 are laid up on a contoured two-part aluminum mold 140 shown in FIG. 14. Mold 140 has an upper plate 142 and a lower plate 144, each having a forming face 146 and 148, respectively. Bottom plate 144 has alignment pins 150 extending therefrom for engagement with counterpart holes 152 formed in upper mold plate 42. In forming of the composite rotor, the layers P1-P29 are laid up on lower plate 144 using a release film between the layers and the lower plate. As will be described below, during the curing step, the upper plate 142 is fitted to lower plate 144 with the layers of material therebetween.

Figure 15:
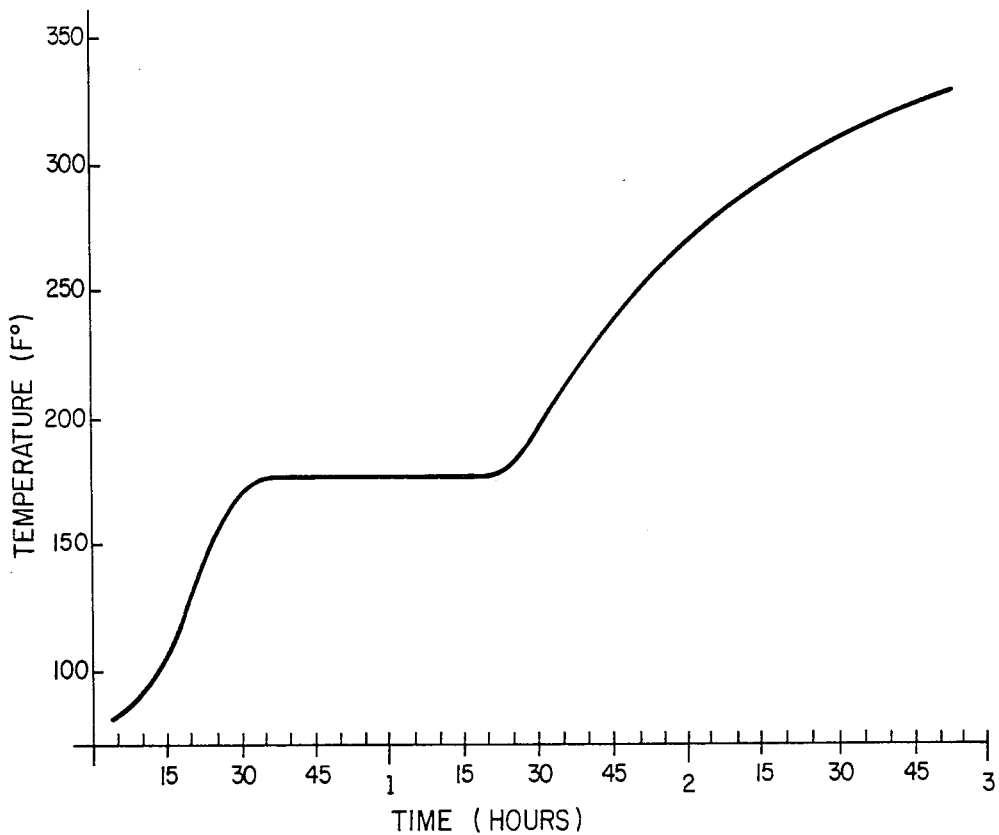
FIG. 15 is one time/temperature graph of the several different possible cycles used in curing the rotor.

The curing steps are accomplished as follows. The composite rotor is covered with a release film. Then the contoured top plate 142 of mold 140 is positioned thereover. A pressure of 30 psi is applied to the outside of the mold, by way of a platen press. Heat is then applied and the press platen temperature raised such that the part follows the time-temperature profile shown in FIG. 15. It will be noticed that the cure process involves holding at 180° F. for 45 minutes. This is done to permit volatiles in the inside layers to be released prior to proceeding with the curing cycle.

Heating is continued until the nominal cure holding temperature of 325° F., +25° or −10° F., is reached. When the temperature reaches this level, a one hour hold is started. After the hold, the heaters are turned off and the part is allowed to cool under pressure. When the part is cooled to 175° F., the pressure is released and the press opened. When cool enough to handle, the part is removed from the mold, visually examined, weighed, measured and tap tested. The part is rough trimmed to remove rough edges and then subjected to non-destructive testing. The part is examined for delaminations and gross porosity using through transmission ultrasonic testing.

Figure 16:
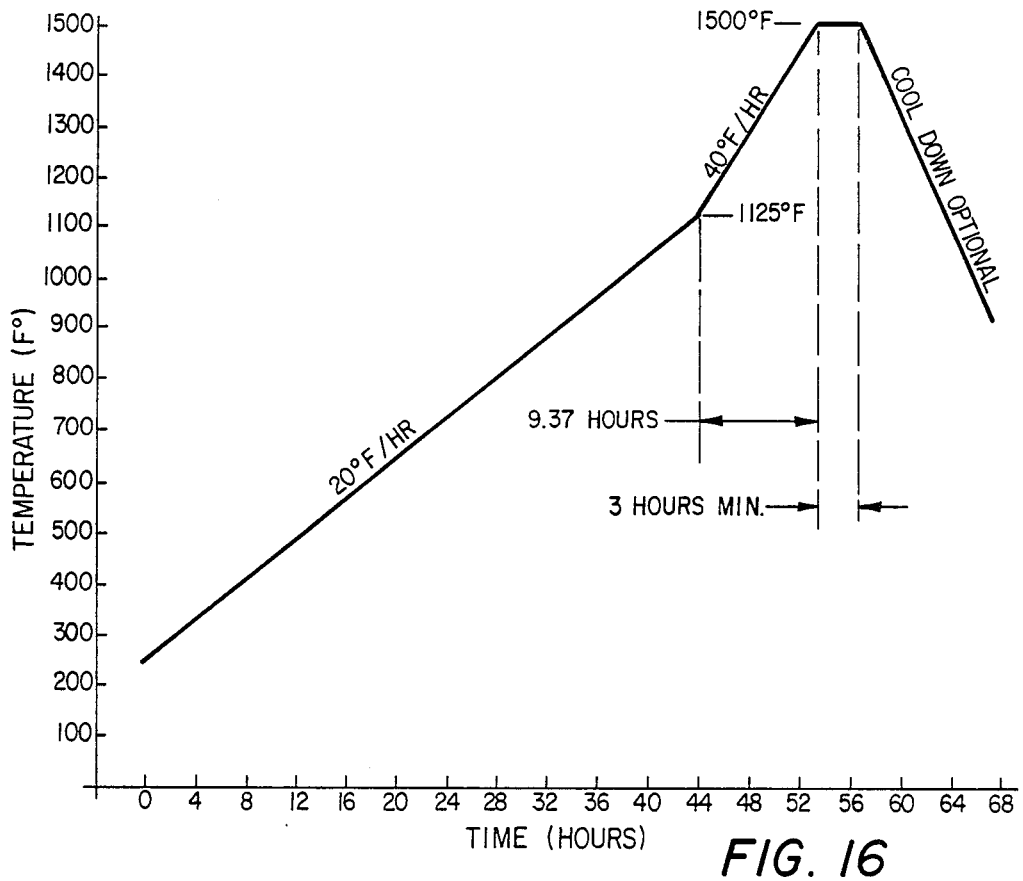
FIG. 16 is a time/temperature graph of the several different possible cycles used in pyrolysis of the rotor.
Figure 17:
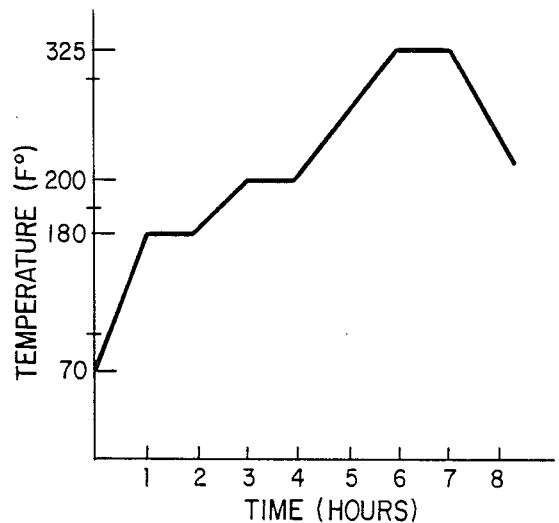
FIG. 17 is one time/temperature graph of the several different possible cycles used in densification of the rotor.

The curing process described above is followed by pyrolysis. The laminate rotor is placed in a restraint fixture to prevent warping, then loaded into a steel retort. The contoured rotor is mated to machined graphite restraint tooling and dead weight loaded. The remaining space in the retort is filled with calcine coke. A retort lid is fitted into a sand seal which allows pyrolysis gases to escape. The standard pyrolysis cycle is normally a three-day cycle for the furnace time-temperature profile. The specific profile used is shown in FIG. 16. As will be noted, the profile starts at 250° F. and follows a constant increase to 1125° F. at 20° F. per hour taking 44 hours. The rate is then increased to 40° F. per hour until 1500° F. is reached, requiring another 9½ hours. Then there is a soak to insure that the parts in the interior of the retort reach 1500° F. Normally this soak is 8 hours to insure that parts are heated to 1500° F. for a minimum of two hours. Depending on the furnace and retort size, the cool down rate varies. Where possible, the retort is taken out of the hot furnace. Otherwise, when the retort is left in the furnace, the furnace door is open. Normally a one-day cooldown is sufficient. After pyrolysis, the part is again weighed and measured.

The laminate rotor is densified following pyrolysis. Densification consists of a series of impregnations and repyrolysis cycles. For impregnation, the parts are placed within a liner within a pressure vessel. Pieces of aluminum wire are used as spacers so that there is space on all faces of the part. A rough vacuum is drawn and held for one hour to remove air from the porous parts, then a liquid phenolic resin, such as K640, is drawn in until it completely covers the parts. Air pressure of 80-100 psi is applied for thirty minutes to force the resin into the porosity, i.e., the poous parts. The resin is then forced out and the pressure vented. The parts are removed and excess resin is wiped off.

The rotor then proceeds to a cureclave, where the rotor is constrained by tooling. The cureclave is pressurized to 80-100 psi pressure.

One densification cure is a stepwise process with three one-hour holds. This process is shown in FIG. 16. The time to change temperatures depends on the mass load in the cureclave. The nominal cure time to the end of the 325° F. hold is seven hours. The parts are cooled to 175° F. before pressure is released and the parts removed.

The parts are then pyrolyzed using the cycle previously described. This constitutes one densification cycle. The parts are densified 3, 4 or 5 times depending upon the number of times necessary to achieve the desired strength.

Although a preferred method has been disclosed with respect to the steps for debulking, curing, pyrolyzing and densifying of the laminate rotor, it will be appreciated by those skilled in the art that many variations may be incorporated in these steps while still practicing the present invention. Further, although the primary embodiment includes the use of a single graphite fiber tow in producing the spiral plies used in construction of the rotors, more than one strand may be used end to end. In such a case, stress transfer would be by shear rather than by tension in these localized areas of the plies in the rotor.

It will be appreciated that the present invention provides a composite, carbon-carbon rotor that is substantially orthotropic in structural capability under loading resulting from rotation. Further, the present invention produces a composite rotor having a cross sectional area tapered from the center section to the outer circumference. The tapered configuration is a product of using varying diameters of spiral plies and forming the individual spiral plies such that these layers have tapered cross sections. The present invention provides a method and means for varying the cross sectional configuration of the rotor by modifying both the dimensions of the individual plies as well as the cross sectional configuration of the individual plies. Thus, differing rotor designs may be readily produced using the method and apparatus of the present invention. Further, subsequent to the forming of the completed rotor according to the present invention, the final configuration may be altered by machining or otherwise shaping the completed rotor in accordance with presently known techniques to produce a rotor of the design and shape required. Even with these modifications, the production of a rotor using a combination of spiral and cloth plies in accordance with the teachings of the present invention produces a rotor having orthotropic properties capable of withstanding rotational stresses in excess of those which present designs can withstand.

Further, by varying the number of plies used, the thickness and composition of the rotor may be readily altered.

Although preferred embodiments of the invention have been described in the foregoing detailed description and illustrated in the accompanying drawings, it will be understood that the invention is not limited to the embodiments disclosed, but is capable of numerous rearrangements, modifications, and substitutions of parts and elements without departing from the spirit of the invention. The present invention is therefore intended to encompass such rearrangements, modifications and substitutions of parts and elements as fall within the scope of the invention.

We claim:

1. A high-speed rotor for a power translating device comprising:
   a plurality of plies layered to from the thickness of the rotor, certain of said plies comprising cloth of fibrous material and other of said plies comprising spiral wrapped fibrous material, wrapped spirally around the rotor axis, the rotor varying in thickness from the center axis to the outer edge to provide a desired variation in the cross-sectional configuration of the rotor, the plies of cloth extending to the peripheral portions of the rotor, the plies formed of spiral wrapped fibrous material being disposed between adjacent ones of the plies of cloth.

2. The high-speed rotor according to claim 1 wherein said spiral plies are tapered radially outwardly.

3. The high-speed rotor according to claim 1 wherein said spiral plies are contoured.

4. The high-speed rotor or rotor hub according to claim 1 wherein the spiral and cloth plies are alternated in making up the rotor.

5. The high-speed rotor according to claim 1 wherein said spiral plies are comprised of fibrous graphite tow preimpregnated with a thermosetting polymer material and wherein said cloth plies are comprised of fibrous graphite preimpregnated with a thermosetting polymer material, and
   wherein said impregnated plies are cured under a predetermined time/temperature/pressure cycle and then pyrolyzed and densified at predetermined temperatures to form a high strength, carbonized structure.

6. A high-speed rotor for a power translating device comprising:
   a plurality of plies layered to form the thickness of said rotor, certain of said plies comprising cloth of fibrous material and other of said plies comprising spiral wrapped fibrous material, wrapped in spiral array around the rotor axis, said cloth and spiral wrapped plies being formed in a matrix of a thermosetting polymer material, said plies of cloth and said plies of spiral wrapped material extending in mutually orientation, the plies of cloth extending to the peripheral portions of the rotor, the plies formed of spiral wrapped fibrous material being disposed between adjacent ones of the plies of cloth.

7. The high-speed rotor according to claim 6 wherein certain of the cloth plies are positioned at predetermined orientations such that the warp axes are not aligned.

8. A carbonized rotor disc for a power translating device comprising:
   a plurality of plies of fibrous material in a matrix of a thermosetting polymer material, certain of said plies comprising cloth of fibrous material and others of said plies comprising spiral wrapped fibrous material, wherein selected ones of said individual spiral plies have variation in thicknesses from the center to the outer edge such that the contour of said rotor is varied in cross section.

9. The carbonized rotor according to claim 8 wherein certain of the cloth plies are positioned at predetermined orientations such that the warp axes are not aligned.

10. A method for forming a high-speed rotor or rotor hub for a power translating device comprising:
    forming a plurality of plies using cloth of carbon or graphite fibrous material preimpregnated with a thermosetting polymer material,
    forming a plurality of plies using carbon or graphite fibrous tow preimpregnated with a thermosetting polymer material by winding the tow to form spiral plies, said plies having varying cross sectional contours to produce a rotor having a predetermined cross sectional contour,
    stacking said layers using a predetermined arrangement of the cloth plies and the spiral plies,
    debulking the stacked plies by subjecting the plies to a sufficient pressure and thereafter curing the composite plies using predetermined time/temperature/pressure cycles,
    pyrolyzing and densifying said plies under an elevated temperature to form a high-strength, carbonized structure.

11. The method according to claim 10 wherein the spiral plies are outwardly tapered to produce a rotor having an outward taper.

12. A high-speed rotor for a power translating device made by the method comprising:

forming a plurality of plies using cloth of carbon or graphite fibrous material preimpregnated with a thermosetting polymer material, forming another plurality of plies using carbon or graphite fibrous tow preimpregnated with a thermosetting polymer material by winding the tow to form spiral plies, said plies having varying cross sectional contour, stacking said impregnated plies using a predetermined arrangement of the cloth plies extending to the rotor periphery and the spiral plies, debulking the stacked plies by subjecting the plies to a sufficient pressure and thereafter curing the composite plies using predetermined time/temperature/pressure cycles, pyrolizing and densifying said plies under an elevated temperature to form a high-strength, carbonized structure.

13. The rotor of claim 6, wherein the rotor is pyrolized to form a carbonized composite structure.

* * * * *